United States Patent
Beauchamp et al.

(10) Patent No.: US 6,829,658 B2
(45) Date of Patent: Dec. 7, 2004

(54) COMPATIBLE SIGNAL-TO-PIN CONNECTOR ASSIGNMENTS FOR USAGE WITH FIBRE CHANNEL AND ADVANCED TECHNOLOGY ATTACHMENT DISK DRIVES

(75) Inventors: Robert William Beauchamp, Milford, MA (US); Douglas E. Peeke, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 2 days.

(21) Appl. No.: 10/320,212

(22) Filed: Dec. 16, 2002

(65) Prior Publication Data

US 2004/0117517 A1 Jun. 17, 2004

(51) Int. Cl.[7] .................................................. G06F 3/00
(52) U.S. Cl. .......................................... 710/16; 710/10
(58) Field of Search .............................. 340/2.24; 714/7, 714/42; 710/13, 16, 10, 15, 62, 11, 5, 6

(56) References Cited

U.S. PATENT DOCUMENTS

| | | | |
|---|---|---|---|
| 5,276,445 A | * | 1/1994 | Mita et al. .................. 340/2.24 |
| 5,603,056 A | | 2/1997 | Totani |
| 5,673,132 A | | 9/1997 | Carbone, Jr. et al. |
| 5,841,997 A | | 11/1998 | Bleiweiss et al. |
| 5,890,214 A | | 3/1999 | Espy et al. |
| 5,901,151 A | | 5/1999 | Bleiweiss et al. |
| 5,996,027 A | * | 11/1999 | Volk et al. ...................... 710/13 |
| 6,209,060 B1 | * | 3/2001 | Machida ......................... 714/7 |
| 6,317,800 B1 | | 11/2001 | Westby et al. |
| 6,421,711 B1 | | 7/2002 | Blumenau et al. |
| 6,425,049 B1 | * | 7/2002 | Yamamoto et al. ............. 714/7 |
| 6,430,714 B1 | | 8/2002 | McAdam et al. |
| 6,434,498 B1 | * | 8/2002 | Ulrich et al. .................. 714/42 |
| 6,473,301 B1 | | 10/2002 | Levy et al. |
| 2002/0044562 A1 | | 4/2002 | Killen, Jr. et al. |
| 2002/0046276 A1 | | 4/2002 | Coffey et al. |

* cited by examiner

Primary Examiner—Jeffrey Gaffin
Assistant Examiner—Joshua D Schneider
(74) Attorney, Agent, or Firm—Guerin & Rodriguez, LLP; Michael Rodriguez

(57) ABSTRACT

Described are a storage system and a method for adapting to an incompatible disk drive that has been installed in a storage enclosure. An adapter board receives a signal from a control board that indicates a type of the control board. In response to the first signal, the adapter board determines whether the type of the control board is compatible with a disk drive that is installed in the storage enclosure. If the control board is of an incompatible type, the adapter board sends a signal to the control board that causes the control board to bypass the installed disk drive.

20 Claims, 5 Drawing Sheets

COMPATIBLE SIGNAL-TO-PIN CONNECTOR ASSIGNMENTS FOR USAGE WITH FIBRE CHANNEL AND ADVANCED TECHNOLOGY ATTACHMENT DISK DRIVES

FIELD OF THE INVENTION

The invention relates generally to data storage systems that can be used in computer systems and computer networks. More particularly, the invention relates to assigning signals to the contacts of a connector for usage with different types of disk drives in the data storage systems.

BACKGROUND

Referring to FIG. 1, a typical storage system 10 includes at least one rack 12 of storage devices or enclosures 14, 14'. The storage system 10 can have fewer or more enclosures than those shown (internal or external to the rack 12). In general, the enclosure 14 is a storage device having a plurality of disk modules 18. Examples of storage devices include disk-array enclosures (DAE) and disk-array processor enclosures (DPE). A typical DAE includes a plurality of disk modules (e.g., fifteen), one or two link control cards (LCCs), and one or two power supplies. A typical DPE includes a plurality of disk modules (e.g., fifteen), one or two storage processors, one or two LCCs, and one or two power supplies. Disk modules 18 include a carrier assembly that holds a disk drive and slides into the enclosure 14.

Each enclosure 14, 14' implements redundancy with an "A" side and a "B" side. In enclosure 14, for example, each side has a link control card (LCC) 22, 22' and a power supply (not shown). Reference numerals for the B side components are the same as corresponding components on the A side with the addition of a prime (') designation. Each LCC 22, 22' includes a primary communications port 26, 26' and an expansion communications port 30, 30'. The enclosures 14, 14' are connected to each other by cables 34, 34' in a loop topology. Communication signals traverse the loop in one direction and pass from enclosure 14 to enclosure 14', in a daisy-chain fashion, and then return from enclosure 14' to enclosure 14. An enclosure receiving communication signals targeted for a different enclosure forwards those signals along the loop.

A common implementation of the loop is a Fibre Channel arbitrated loop. Fibre Channel is a computer communications protocol for communicating signals at a data rate of up to 2 Gbps. In general, the Fibre Channel protocol provides an interface by which host processors (and servers) communicate with the enclosures 14 and with the disk modules 18 installed within the enclosures 14. Typically, the disk modules 18 have Fibre Channel disk drives.

Disk drive manufacturers have for many years produced another type of disk drive, called Advanced Technology Attachment (ATA) disk drives, for the personal computer (PC) industry. To satisfy the high volumes and the small profit margins of PCs, the disk drive manufacturers have refined their processes to improve the reliability and storage capacity of the ATA disk drives and to reduce their cost. Typically, the cost of an ATA disk drive is two to three times lower and its storage capacity two times greater than that of a Fibre Channel disk drive. Thus, the net price per storage capacity advantage for ATA disk drives can be four to six times that of Fibre Channel disk drives. Consequently, ATA disk drives present an attractive adjunct to Fibre Channel disk drives for storage system developers and have found their way into storage systems. The price and capacity benefits gained from ATA disk drives come, however, at a loss of performance. Fibre Channel disk drives generally perform at twice the speed of ATA disk drives.

This tradeoff is likely to lead to the mixing of Fibre Channel and ATA disk drive types within a storage system. A problem occurs, however, when an ATA disk drive is mistakenly installed in a Fibre Channel enclosure. ATA disk drives are incompatible with Fibre Channel LCCs because they communicate according to different protocols. Thus, an ATA disk drive in a Fibre Channel enclosure is an inoperative combination. Further, the incorrect installation can cause damage to the ATA disk drive, to the Fibre Channel enclosure or to both, and can also cause the entire Fibre Channel arbitration loop, and thus the storage system, to fail. Therefore, there is a need to provide a mechanism that mitigates the effects of the improper installation of an ATA disk drive in a Fibre Channel enclosure.

SUMMARY

In one aspect, the invention features a method for adapting to an incompatible disk drive that has been installed in a storage enclosure. A first signal is received at a disk module from a control board indicating a type of the control board. In response to the first signal, it is determined that the type of the control board is incompatible with a disk drive that is installed in the storage enclosure. A second signal is sent from the disk module to the control board that causes the control board to bypass the installed disk drive.

In another aspect, the invention features an adapter board for providing an interface between a disk drive and a control board. The adapter board comprises an electrical connector having a contact for providing an electrical interface to a signal line when the adapter board is in electrical communication with the control board. The adapter board also includes a controller, electrically connected to the contact of the electrical connector, for sending a signal through the contact to the control board by way of the signal line when the adapter board is in electrical communication with the control board. The signal has a first function when a type of the control board is incompatible with the disk drive and a second function when the type of control board is compatible with the disk drive.

The invention also features a disk module comprising a disk drive and an adapter board. The adapter board is electrically connected to the disk drive for providing an interface between the disk drive and a control board. The adapter board includes an electrical connector having a contact for providing an electrical interface to a signal line when the adapter board is in electrical communication with the control board, and a controller electrically connected to the contact of the electrical connector for sending a signal through the contact to the control board by way of the signal line when the adapter board is in electrical communication with the control board. The signal having a first function when a type of the control board is incompatible with the disk drive and a second function when the type of control board is compatible with the disk drive.

The invention also features an enclosure of a storage system, comprising a disk module having a disk drive and an adapter board electrically connected to the disk drive for providing an interface between the disk drive and a control board. The adapter board includes an electrical connector having a contact for providing an electrical interface to a signal line when the adapter board is in electrical communication with the control board, and a controller electrically connected to the contact of the electrical connector for sending a signal through the contact to the control board by way of the signal line when the adapter board is in electrical communication with the control board. The signal has a first function when a type of the control board is incompatible with the disk drive and a second function when the type of control board is compatible with the disk drive.

In still another aspect, the invention features a disk module, comprising a disk drive communicating according to a first protocol, and an adapter board electrically connected to the disk drive and configured to electrically communicate with a first type of control board that communicates according to the first protocol and with the disk drive. The adapter board has a capability of communicating with a second type of control board that uses a second protocol to communicate with disk drives. The second protocol is incompatible for communicating with the disk drive.

Also, the invention features an adapter board for providing an interface between a disk drive and a control board. The adapter board comprises electrical contact means for providing an electrical interface to a signal line when the adapter board is in electrical communication with the control board, and means for sending a signal through the electrical contact means to the control board by way of the signal line when the adapter board is in electrical communication with the control board. The signal has a first function when a type of the control board is incompatible with the disk drive and a second function when the type of control board is compatible with the disk drive.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The installation of an Advanced Technology Attachment (ATA) disk drive in a Fibre Channel (FC) enclosure, aside from producing an inoperative combination, has potentially damaging consequences to the ATA disk drive and to the FC enclosure, and can cause an FC loop of a storage system to malfunction. In brief overview, the present invention provides a mechanism for avoiding such damage and enabling the storage system to operate unimpaired by the improper installation.

Figure 1:
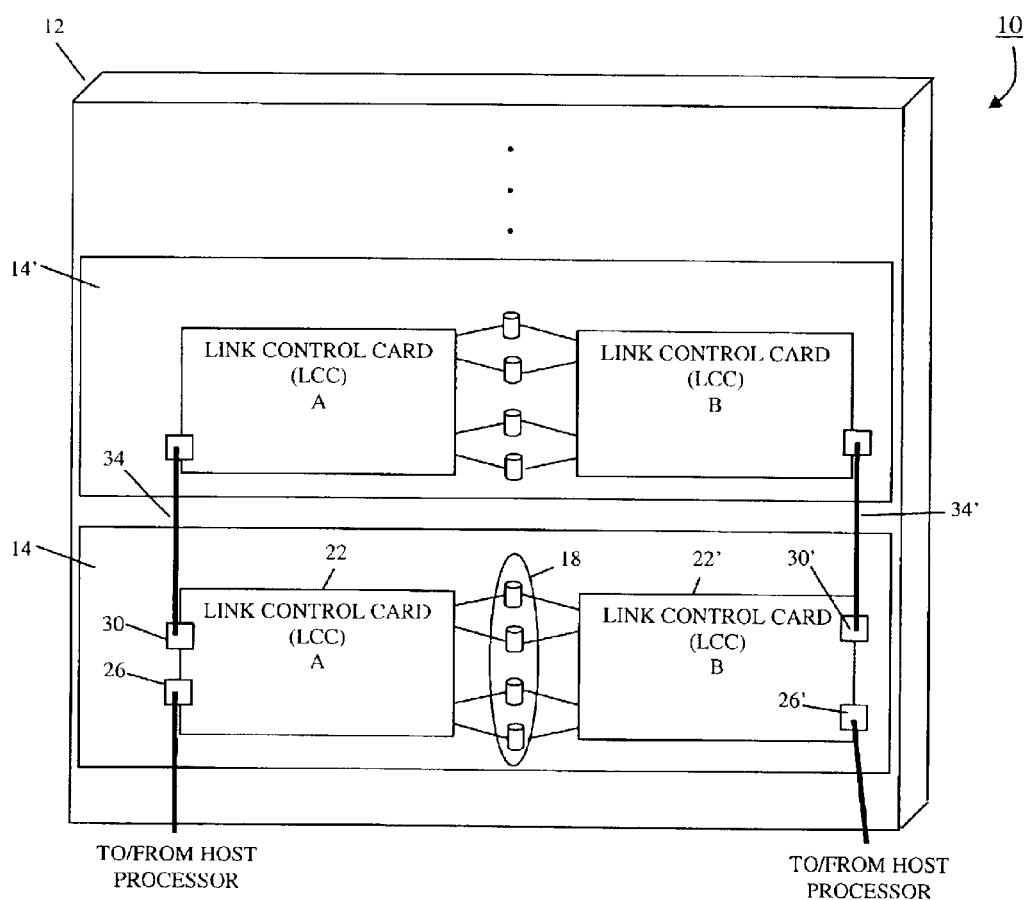
FIG. 1 is a diagram showing an example of a storage system including a plurality of enclosures connected in a Fibre Channel (FC) arbitrated loop.
Figure 2:
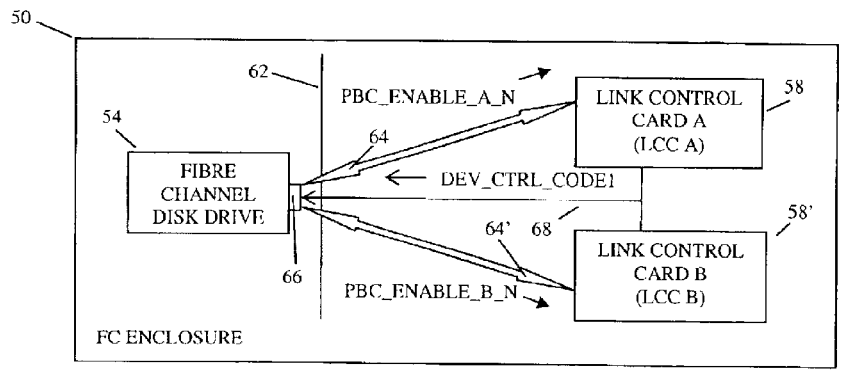
FIG. 2 is a diagram showing an example of an FC enclosure constructed in accordance with the principles of the invention, the FC enclosure including an FC disk drive in communication with a plurality of FC link control cards (LCCs).

FIG. 2 shows an embodiment of an FC enclosure 50 constructed in accordance with the principles of the invention. The FC enclosure 50 has an FC disk drive 54, an A-side FC link control card 58 and a B-side FC link control card 58' (generally, FC LCC 58). The FC disk drive 54 has two ports (dual ported); that is, communications with the disk drive 54 can occur over either port. The FC disk drive 54 is electrically connected to a midplane 62 by a midplane connector 66.

The FC LCCs 58, 58' are electrically connected to the FC disk drive 54 through the midplane 62. The FC LCC A 58 is in electrical communication with one port of the FC disk drive 54 over signal lines 64, and the FC LCC B 58' is in electrical communication with the other port of the FC disk drive 54 over signal lines 64'. Each FC LCC 58 is also in communication with the FC disk drive 54 by a shared signal line 68.

To enable adding the FC disk drive 54 to or removing the FC disk drive 54 from a FC arbitrated loop without disrupting the operation of the storage system, each FC LCC 58 includes bypass circuitry. The FC disk drive 54 sends port bypass signals PBC_ENABLE_A_N and PBC_ENABLE_B_N to the bypass circuitry of the respective FC LCCs 58, 58' on the respective signal lines 64, 64', to control whether that FC LCC 58 bypasses the FC disk drive 54. In general, the "_N" portion of a signal name indicates that the signal is asserted when in a low state and de-asserted when in a high state. Thus, each FC LCC 58 bypasses the FC disk drive 58, i.e., excludes the disk drive 54 from the FC loop, when the corresponding port bypass signal is asserted low. In an alternate embodiment, asserting a signal involves placing the signal into a high state and de-asserting a signal means placing the signal into a low state.

When a disk drive (either a FC disk drive or an ATA disk drive) is installed in the FC enclosure 50, one of the FC LCCs 58 sends an identification signal (DEV_CTRL_CODE1) over the signal line 68. Because the FC LCCs 58, 58' share the signal line 68, either FC LCC 58 can send the identification signal. As described in more detail below, this identification signal arrives on a particular contact (or pin) of the midplane connector 66. In one embodiment, this identification signal (DEV_CTRL_CODE1) is a constant binary value (e.g., a logic high) driven by both FC LCCs 58, 58' on the signal line 68. In this embodiment, the FC LCCs 58, 58' are hardwired at design time to this binary state to be compatible with FC disk drives.

For each FC disk drive 54 installed in the FC enclosure 50, that FC disk drive 54 uses the identification signal (DEV_CTRL_CODE1), in conjunction with other control signals, to identify the Fibre Channel data rate of the storage system. When the Fibre Channel data rate is 2 Gbps, the DEV_CTRL_CODE1 signal is set to a logic high state. If an ATA disk drive has been installed in the FC enclosure 50, the identification signal (DEV_CTRL_CODE1) operates to indicate that the transmitting FC LCC 58 is an FC control card; that is, in accordance with the principles of the invention an ATA disk module (described below) uses the logic high state of the identification signal (DEV_CTRL_CODE1) on signal line 68 to recognize that it has been improperly installed in the FC enclosure 50.

Figure 3:
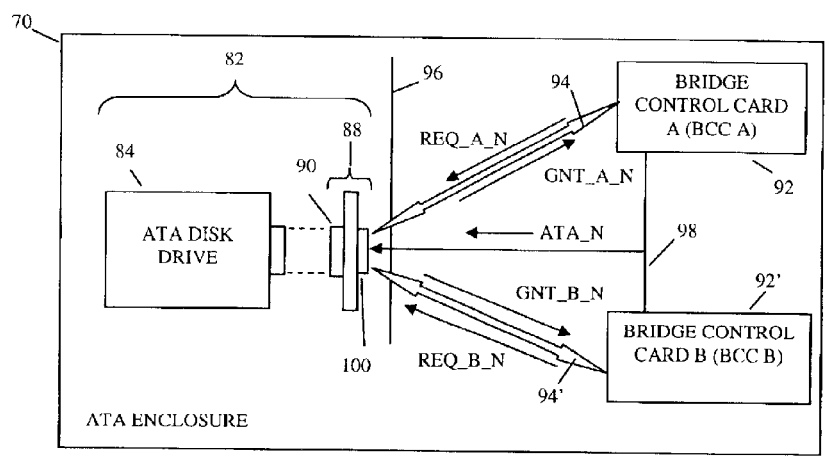
FIG. 3 is a diagram showing an embodiment of an Advanced Technology Attachment (ATA) enclosure constructed in accordance with the principles of the invention, the ATA enclosure including an ATA disk drive, an adapter board, and a plurality of ATA bridge control cards (BCCs).

FIG. 3 shows an embodiment of an ATA enclosure 70 constructed in accordance with the principles of the invention. The ATA enclosure 70 has an ATA disk module 82 including an ATA disk drive 84 and an adapter board 88, an A-side ATA bridge control card 92 and a B-side ATA bridge control card 92' (generally ATA BCC 92). The ATA disk drive 84, which can be a parallel ATA (PATA) disk drive or a serial ATA (SATA) disk drive, is electrically connected to a disk drive connector 90 attached to one side of the adapter board 88. The adapter board 88 is electrically connected to a midplane 96 by a midplane connector 100 attached to the other side of the adapter board 88. In general, the adapter board 88 makes the ATA disk module 82 physically and electrically compatible with a Fibre Channel disk module.

More specifically, to provide physical compatibility the ATA disk module 82 and the FC disk drive 54 (FIG. 2) use the same type of midplane connector to connect to a midplane; that is, the midplane connector 100 and the midplane connector 66 (FIG. 2) for the FC disk drive have the same number of contacts and contact configuration. Thus, the ATA disk module 82, with its ATA disk drive 84 and adapter board 88, can be mechanically plugged into the same slot of an enclosure as a Fibre Channel disk module. As used throughout this description, the terms contact and pin are used interchangeably, and the use of either term is not intended to impose any limitation on the shape or form of the contact or pin or to limit the invention to any particular type of midplane connector.

For electrical compatibility, ATA signals are assigned to particular contacts of the midplane connector 100 (referred to as signal-to-pin assignments) such that an ATA disk drive mistakenly installed in an FC enclosure does not (1) cause damage to the ATA disk drive or to the FC enclosure, or (2) disrupt the proper operation of any other disk drive in the same enclosure or of the other enclosures connected to the FC arbitrated loop. Similarly, an FC disk drive mistakenly inserted into an ATA enclosure does not (1) cause damage to the FC disk drive or to the ATA enclosure, or (2) disrupt the proper operation of any other disk drive in the same enclosure or of the other enclosures connected to the FC arbitrated loop.

Each ATA BCC 92, in general, operates as a communications bridge between the FC arbitrated loop and the ATA disk drive 84. The ATA BCCs 92, 92' are each in electrical communication with the midplane connector 100 through the midplane 96. The ATA BCC A 92 communicates with the adapter board 88 over signal lines 94, the ATA BCC B 92' over signal lines 94', and both ATA BCCs 92, 92' over signal line 98.

The ATA disk drive 84 is a single port device, and thus for each ATA BCC 92 to communicate with the ATA disk drive 84, that ATA BCC 92 issues a request signal to the adapter board 88 and expects to receive a grant signal from the adapter board 88 in reply. The adapter board 88 converts the single port of the ATA disk drive 84 into a dual port disk module 82. The adapter board 88 arbitrates between the ATA BCCs 92, 92' through the use of the request and grant signals to determine which ATA BCC 92 can currently communicate with the ATA disk drive 84. FIG. 3 also shows the exchange of the request signals and grant signals (REQ_A_N and GNT_A_N) between the adapter board 88 and the BCC A 92 over signal lines 94 and of request signals and grant signals (REQ_B_N and GNT_B_N) between the adapter board 88 and the BCC B 92' over signal lines 94'.

Also, each ATA BCC 92 can assert an identification signal (ATA_N) to the adapter board 88 on signal line 98. Because the ATA BCCs 92 share the signal line 98, either ATA BCC 92 can assert the identification signal. The ATA identification signal ATA_N on signal line 98 arrives at the same particular contact of the midplane connector 100 as the FC identification signal DEV_CTRL_CODE1 at the midplane connector 66 (FIG. 2) via signal line 68. In the embodiment in which the FC identification signal DEV_CTRL_CODE1 is a binary value, an asserted ATA identification signal ATA_N is the opposite binary value. Accordingly, an asserted identification signal ATA_N on signal line 98 indicates to the adapter board 88 that the transmitting control board is an ATA BCC 92 and a de-asserted ATA_N signal on signal line 98 signifies that the transmitting control board is not an ATA BCC 92 (or, conversely, is an FC LCC 58).

Figure 4:
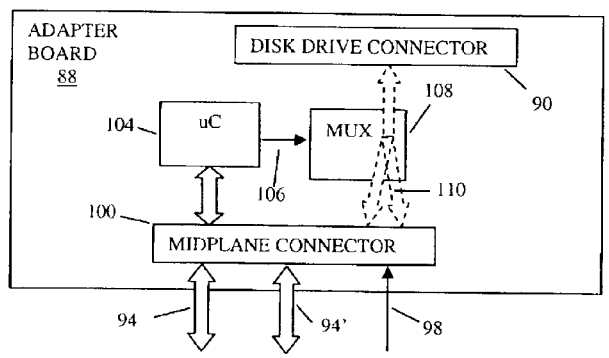
FIG. 4 is a diagram showing an embodiment of the adapter board shown in FIG. 3 and the communication signals used by the ATA BCCs to communicate with the ATA disk drive.

FIG. 4 shows a simplified embodiment of the adapter board 88 including a programmable integrated circuit or microcontroller 104 (hereafter, controller 104), a multiplexer (MUX) 108, the disk drive connector 90, and the midplane connector 100. In general, the controller 104 is an electronic component such as an ASIC (application specific integrated circuit) or a PLD (programmable logic device). The controller 104 has a request signal input terminal for each ATA BCC 92 for receiving request signals from that ATA BCC 92 and a grant signal output terminal for each ATA BCC 92 for sending grant signals to that ATA BCC 92. The controller 104 also includes non-volatile memory for storing information, such as data and software code.

The controller 104 is in electrical communication with the MUX 108 by signal line 106. Through the MUX 108 the controller 104 controls which ATA BCC 92, 92' communicates with the ATA disk drive 84. Under the control of the controller 104, the MUX 108 enables a communication path between one of the ATA BCCs 92, 92' and the ATA disk drive 84. (The forked dashed arrow 110 passing through the MUX 108 indicates that the MUX 108 operates as a switch that enables or disables communication between each of the ATA BCCs 92 and the ATA disk drive 84.)

The controller 104 is also in electrical communication with the midplane connector 100 for receiving identification and request signals from and for transmitting grant signals to the ATA BCCs 92, 92'. Under normal operation, when an ATA disk drive is installed in an ATA enclosure, the identification signal (ATA_N) operates to notify the controller 104 that the disk drive has been placed in an appropriate type of enclosure. As described in more detail below, the controller 104 is programmed to assert both grant signals if the identification signal does not indicate an ATA enclosure.

Figure 5:
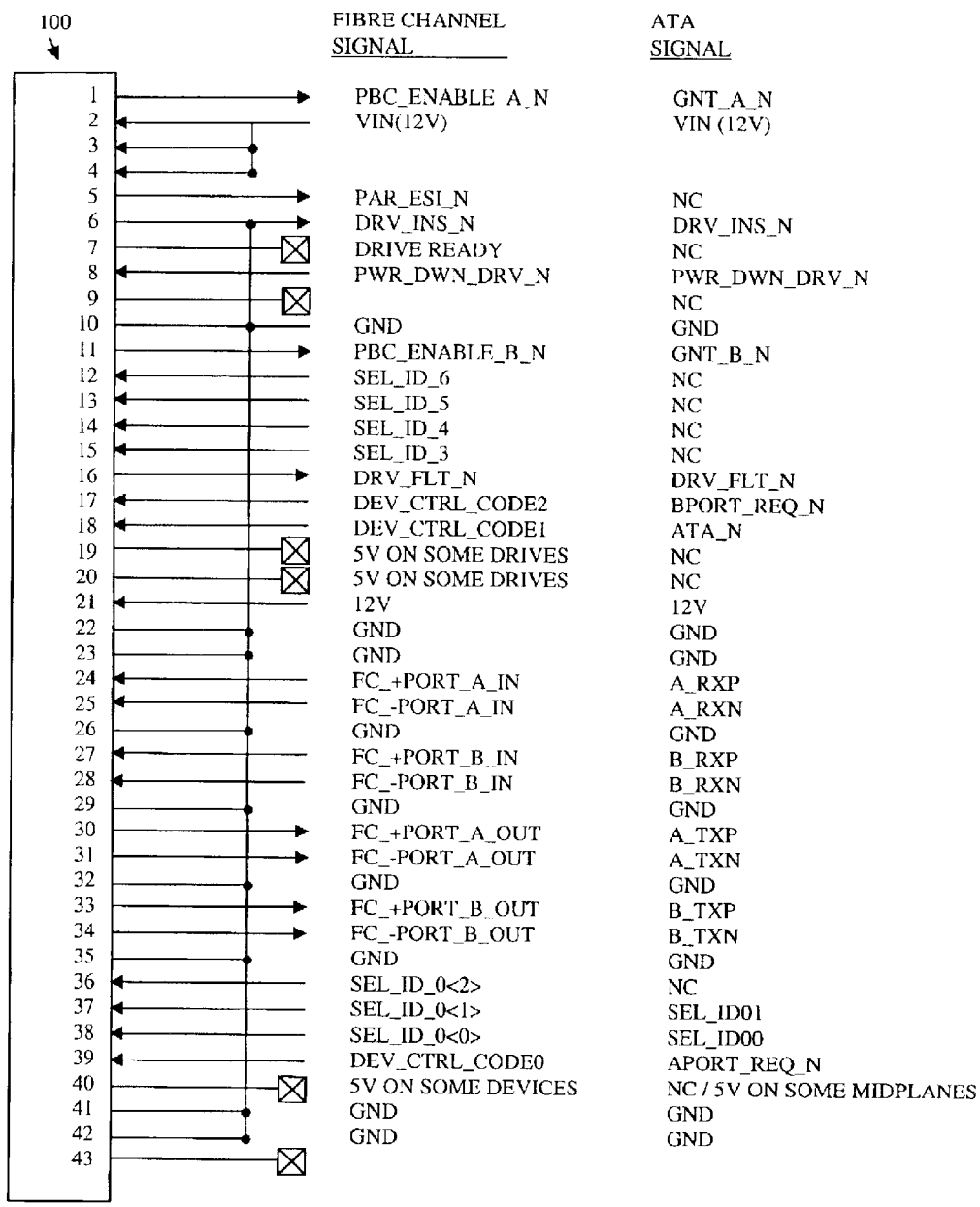
FIG. 5 is a diagram showing an embodiment of a midplane connector and the mapping of signals to contacts of the midplane connector for communicating with the FC LCCs and a corresponding mapping of signals to contacts of the midplane connector for communicating with the ATA BCCs.

FIG. 5 shows the midplane connector 100 of FIG. 3 and an embodiment of the signal assignments for each of the contacts or pins corresponding to each particular control card type (i.e., FC LCC or ATA BCC). Signals arriving at the midplane connector 100 from an FC LCC 58 or from an ATA BCC 92 are denoted by left-pointing arrows; signals leaving the midplane connector 100 to pass to an FC LCC 58 or to an ATA BCC 92 are denoted by right-pointing arrows. The FC and ATA signal names adjacent to each of the numbered contacts identify the respective signals that are assigned to each particular contact. Accordingly, these FC signal-to-pin assignments and ATA signal-to-pin assignments provide alternative uses for some of the contacts of the midplane connector 100, the particular use of such contacts depending upon the type of control card. In accordance with the principles of the invention, the ATA signal-to-pin assignments are selected so as not to affect established FC signal-to-pin assignments; that is, no re-mapping of FC signals to contacts are needed to accommodate the use of these ATA signal-to-pin assignments on the same midplane connector 100.

A first objective achieved by the particular ATA signal-to-pin assignments shown in FIG. 5 is that the ATA signal-to-pin assignments avoid causing damage to either the ATA disk drive 84 or to the FC LCCs 58 when an ATA disk drive 84 is placed into an FC enclosure 50. In general, this objective is achieved by aligning (i.e., mapping to the same contact or pin) according to signal direction (input or output) and to signal type (high speed data, power, command signals). Mapping FC and ATA signals of the same signal direction and of the same signal type to the same contacts avoids a potentially destructive condition under which both the ATA disk drive 84 and the FC LCC 58 are trying to drive a voltage over the same signal line.

FIG. 5 shows examples of alignment between four types of ATA and FC signals: (1) power and ground signals; (2) input signals; (3) output signals; and (4) data signals. For example, power and ground signals are on the same contacts of the midplane connector 100 (e.g., contacts numbered 2 and 10) for both ATA and FC disk drives. Input signals directed to the ATA and FC disk drives are aligned to arrive at the midplane connector 100 (from an FC LCC or from an ATA BCC) on the same contacts, for example, contacts numbered 8, 17, 18, and 39. Output signals pass to the FC LCCs 58 or ATA BCCs 92 through the midplane connector 100 from the same contacts, for example, contacts numbered 1 and 11.

For some input and output signals, the aligned signal is the same signal for both Fibre Channel and ATA, e.g., the DRV_INS_N output signal on contact number 6, the PWR_DOWN_DRV_N input signal on contact number 8, and the DRV_FLT_N output signal on contact number 16. The DRV_INS_N signal, for example, is grounded on the FC disk drives and on the ATA adapter board 88 (accordingly, FIG. 5 shows this signal as grounded). When an enclosure slot is empty, there is no connection to the DRV_INS_N signal and pull-up resistors on the FC LCC 58 or ATA BCC 92, depending upon the type of enclosure, pull the signal to a logical high, indicating that the slot is empty. When either a FC disk drive 54 or an ATA adapter board 88 is plugged in, the DRV_INS_N signal is grounded and the FC LCC 58 or ATA BCC 92 receives a logical low and recognizes that a disk drive or adapter board has been plugged into the slot.

Data signals are also aligned. For example, for both ATA and FC disk drives and control boards, input data signals arrive at the midplane connector 100 on the same contacts numbered 24, 25, 27, 28, and output data signals depart from the midplane connector 100 on the same contacts numbered 30, 31, 33, and 34.

A second objective achieved by the particular ATA signal-to-pin assignments shown in FIG. 5 is to provide a mechanism that prevents the FC enclosure from failing (and thus an entire FC loop) because an ATA disk drive has been placed into the FC enclosure. This objective is accomplished by defining ATA signal-to-pin assignments that take advantage of the port bypass functionality of FC LCCs described above. In one embodiment, the ATA grant signals GNT_A_N and GNT_B_N are aligned with the FC port bypass signals PBC_ENABLE_A_N and PBC_ENABLE_B_N, respectively, on contacts numbered 1 and 11. The assertion of both grant signals is a signal combination that does not occur under normal conditions in an ATA enclosure, thus this signal combination is available for such use. Each FC LCC 58 (FIG. 2) that receives the asserted grant signal interprets it as an asserted bypass signal, thus causing that FC LCC 58 to bypass the ATA disk drive in the loop.

Other achieved objectives are that the ATA signal-to-pin assignments avoid causing damage to either the FC disk drive or to the ATA BCCs when an FC disk drive is placed into an ATA enclosure, and that the other disk drives in the ATA BCCs can continue normal operation. In general, these objectives are also achieved by the signal alignment described above. Although a mistakenly installed FC disk drive receives an ATA_N signal (i.e., a logic low) on contact number 18, the FC disk drive uses this signal as a DEV_CTRL_CODE signal for indicating the Fibre Channel data rate of the storage system. Also, in an ATA enclosure, each disk drive is connected to an individual port on the ATA BCC such that any one port does not affect any other port (unlike what occurs in a loop in an FC enclosure). In the event of a mistakenly installed FC disk drive, the affected ATA BCC determines that the one disk port is inoperable.

Figure 6:
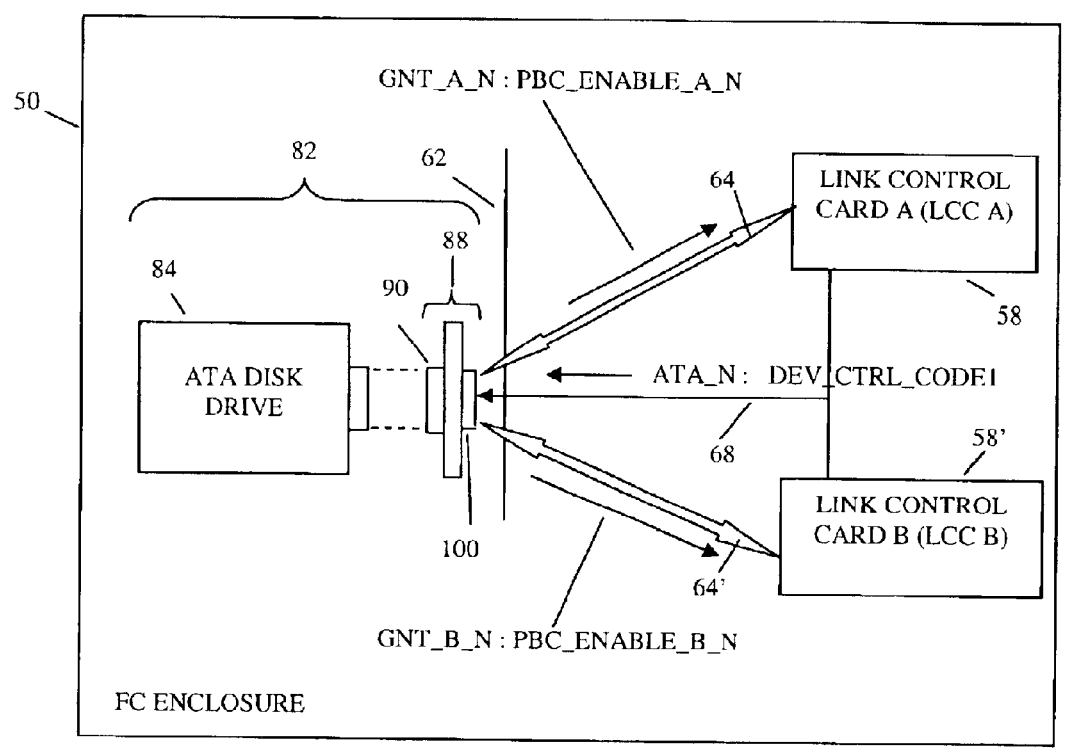
FIG. 6 is a diagram showing an ATA disk module mistakenly installed in an FC enclosure.
Figure 7:
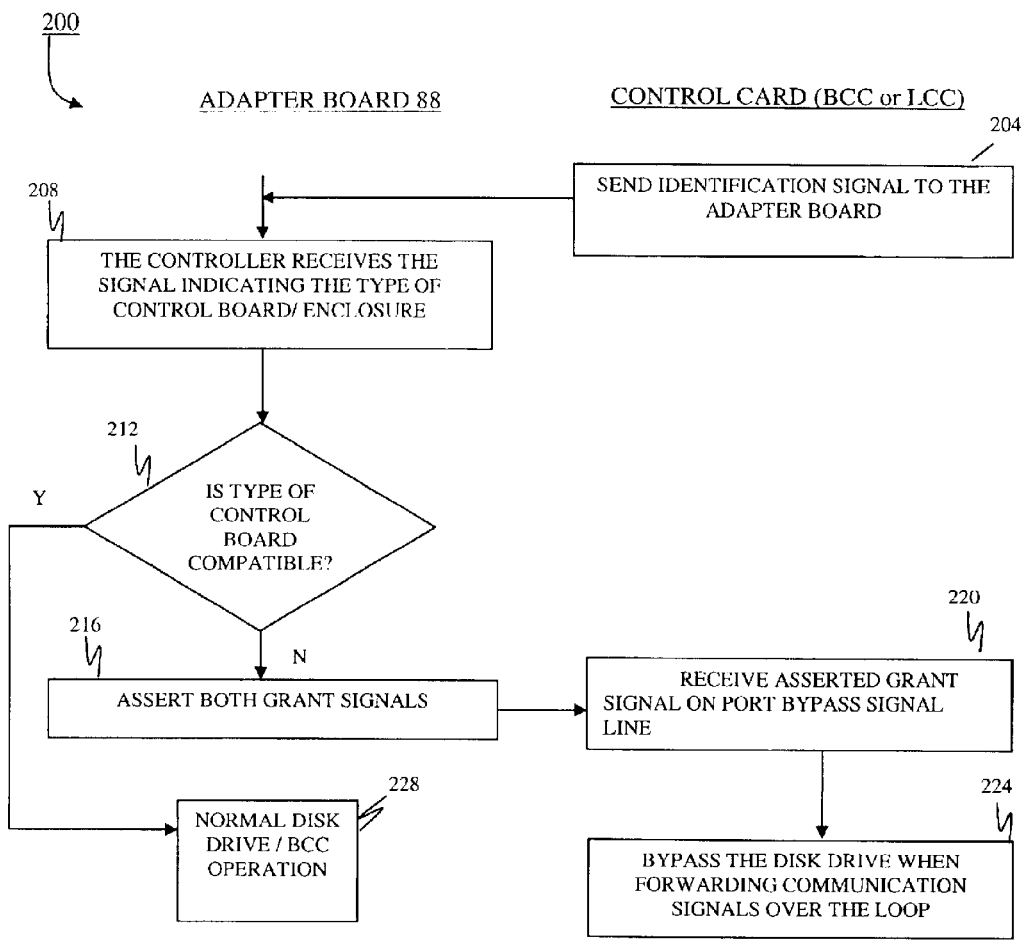
FIG. 7 is a flow chart illustrating an embodiment of a process for detecting and adapting to an ATA disk drive mistakenly installed in an FC enclosure.

FIG. 6 shows the ATA disk module 82 of FIG. 3 as being mistakenly plugged into the midplane connector 62 within the FC enclosure 50 of FIG. 2, and FIG. 7 illustrates an embodiment of a process 200 for detecting when an ATA disk drive has been installed in an FC enclosure. After the ATA disk drive 84 has been installed in the FC enclosure 50, one of the FC LCCs 58 sends (step 204) an identification signal DEV_CTRL_CODE1 to the midplane 62 over signal line 68. The FC identification signal arrives at a particular contact of the midplane connector 100 (here, the contact number 18 that corresponds to the ATA_N signal). At step 208, the controller 104 (FIG. 4) of the adapter board 88 receives the FC identification signal and interprets the FC identification signal as an ATA_N signal (because the DEV_CTRL_CODE1 signal arrived on the ATA_N signal contact number 18). From the identification signal (interpreted to be the ATA_N signal), the controller 104 determines (step 212) whether the adapter board 88 is in electrical communication with a compatible control card (i.e., an ATA BCC 92) or with an incompatible control card (e.g., an FC LCC 58). For example, if the FC identification signal is a logic high signal and the controller 104 expects a logic low signal to arrive on the ATA_N signal contact number 18 (because ATA BCCs drive the signal to a logic low), the controller 104 determines that the signal on signal line 68 is from an incompatible control card.

If the control card is incompatible with the ATA disk drive 84, the controller 104 asserts (step 216) grant signals GNT_A_N and GNT_B_N, on contacts numbered 1 and 11, respectively, of the midplane connector 100 (FIG. 5). One FC LCC 58 receives (step 220) the GNT_A_N grant signal over signal line 64 and interprets the signal as a port bypass signal PBC_ENABLE_A_N, and the other FC LCC 58' receives the GNT_B_N grant signal over signal line 64' and interprets that signal as a port bypass signal PBC_ENABLE_B_N. Both FC LCCs 58, 58' then bypass (step 224) the ATA disk module 82 in the FC loop (e.g., communications forwarded by each FC LCC 58 bypass the ATA disk module 82). Thus, the incompatible ATA disk drive 84 is effectively removed from the loop. Further, those FC disk drives that are properly installed in the FC enclosure 50 and other enclosures that are connected to the FC loop, if any, can continue to operate normally (step 228) although an incompatible disk drive 84 has been installed in the enclosure.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for adapting to an incompatible disk drive that has been installed in a storage enclosure, the method comprising:

receiving at a disk module a first signal from a control board indicating a typo of the control board;

determining, by the disk module in response to the first signal, that the type of the control board is incompatible with a disk drive of the disk module; and sending, in response to determining that the control board is incompatible with the disk drive, a second signal from the disk module to the control board that causes the control board to bypass the installed disk drive.

2. The method of claim 1, wherein the disk drive is an Advanced Technology Attachment (ATA) disk drive and the type of the control board is a Fibre Channel control board.

3. The method of claim 1, wherein the step of sending the second signal to the control board comprises sending the second signal over a signal line that the control board uses to receive port bypass signals.

4. The method of claim 1, wherein the step of sending the second signal to the control board comprises asserting a grant signal by the disk module.

5. The method of claim 1, further comprising sending a third signal to a second control board that causes the second control board to bypass the installed disk drive.

6. The method of claim 5, wherein the step of sending the third signal from the disk module comprises asserting a grant signal by the disk module.

7. An adapter board for providing an interface between a disk drive and a control board, the adapter board comprising:

an electrical connector having a contact for providing an electrical interface to a signal line; and a controllers, electrically connected to the contact of the electrical connectors, sending a signal through the contact to the control board by way of the signal line when the adapter board is in electrical communication with the control board, the signal having a first function when a type of the control board is incompatible with the disk drive and a second function when the type of control board is compatible with the disk drive.

8. The adapter board of claim 7, wherein the first function of the signal on the signal line is to cause the control board to bypass the disk drive.

9. The adapter board of claim 7, wherein the second function of the signal on the signal line is to enable the control board to communicate with the disk drive.

10. The adapter board of claim 7, wherein the first function of the signal on the signal line is to cause the control board to bypass the disk drive and the second function of the signal on the signal line is to enable the control board to communicate with the disk drive.

11. The adapter board of claim 7, wherein the type of control board is incompatible with the disk drive when the disk drive is an Advanced Technology Attachment (ATA) disk drive and the control board is a Fibre Channel control board.

12. The adapter board of claim 7, wherein the electrical connector has a second contact for providing an electrical interface to a second signal line when the adapter board is in electrical communication with the control board, and wherein the controller sends the signal to the control board in response to an identification signal that is received from the control board on the second signal line and identifies the type of the control board.

13. The adapter board of claim 12, wherein the controller sends the signal to the control board if the type of control board is incompatible with the disk drive.

14. The adapter board of claim 7, wherein the control board is a first control board, the electrical connector has a second contact for providing an electrical interface to a second signal line when the adapter board is in electrical communication with a second control board, and the controller sends signals to the first and second control boards that cause the first and second control boards to bypass the disk drive when a type of the control boards is incompatible with the disk drive.

15. A disk module, comprising:

a disk drive; and an adapter board electrically connected to the disk drive for providing an interface between the disk drive and a control board, the adapter board including:

an electrical connector having a contact for providing an electrical interface to a signal line; and a controller, electrically connected to the contact of the electrical connector, sending a signal through the contact to the control board by way of the signal line when the adapter board is in electrical communication with the control board, the signal having a first function when a type of the control board is incompatible with the disk drive and a second function when the type of control board is compatible with the disk drive.

16. An enclosure of a storage system, comprising:

a disk module having a disk drive and an adapter board electrically connected to the disk drive for providing an interface between the disk drive and a control board, the adapter board including:

an electrical connector having a contact for providing an electrical interface to a signal line; and a controller, electrically connected to the contact of the electrical connector, sending a signal through the contact to the control board by way of the signal line when the adapter board is in electrical communication with the control board, the signal having a first function when a type of the control board is incompatible with the disk drive and a second function when the type of control board is compatible with the disk drive.

17. A disk module, comprising:

a disk drive communicating according to a first protocol; and an adapter board electrically connected to the disk drive and configured to electrically communicate with a first type of control board that communicates according to the first protocol and with the disk drive, the adapter board having a capability of communicating with a second typo of control board that uses a second protocol to communicate with disk drives, the second protocol being incompatible for communicating with the disk drive.

18. The disk module of claim 17, wherein the adapter board includes a controller that sends a signal to the second type of control board to cause the second type of control board to bypass the disk module when the disk module is installed in an enclosure having the second type of control board.

19. The disk module of claim 18, wherein the controller receives a signal to the second type of control board to cause the second type of control board to bypass the disk module when the disk module is installed in an enclosure having the second type of control board.

20. An adapter board for providing an interface between a disk drive and a control board, the adapter board comprising:

electrical contact means for providing an electrical interface to a signal line; and means for sending a signal through the electrical contact means to the control board by way of the signal line when the adapter board is in electrical communication with the control board, the signal having a first function when a type of the control board is incompatible with the disk drive and a second function when the type of control board is compatible with the disk drive.

\* \* \* \* \*

UNITED STATES PATENT AND TRADEMARK OFFICE
CERTIFICATE OF CORRECTION

PATENT NO. : 6,829,658 B2
DATED : December 7, 2004
INVENTOR(S) : Beauchamp et al.

It is certified that error appears in the above-identified patent and that said Letters Patent is hereby corrected as shown below:

Column 9,
Line 12, "typo" should be changed to -- type --.
Line 41, "controllers" should be changed to -- controller --.
Line 42, "connectors" should be changed to -- connector --.

Column 10,
Line 58, "typo" should be changed to -- type --.

Signed and Sealed this

Nineteenth Day of April, 2005

JON W. DUDAS
*Director of the United States Patent and Trademark Office*